US012584628B1

(12) United States Patent
Kolodji

(10) Patent No.: US 12,584,628 B1
(45) Date of Patent: Mar. 24, 2026

(54) PROCESS AND SYSTEM FOR WASTE HEAT RECOVERY FROM A FLUE GAS GENERATOR

(71) Applicant: Black Swan, LLC, Bakersfield, CA (US)

(72) Inventor: Brian Kolodji, Bakersfield, CA (US)

(73) Assignee: Black Swan, LLC, Bakersfield, CA (US)

( * ) Notice: Subject to any disclaimer, the term of this patent is extended or adjusted under 35 U.S.C. 154(b) by 393 days.

(21) Appl. No.: 18/197,236

(22) Filed: May 15, 2023

(51) Int. Cl.

| | |
|---|---|
| *F23J 15/06* | (2006.01) |
| *A01G 7/02* | (2006.01) |
| *B01D 3/26* | (2006.01) |
| *B01D 3/32* | (2006.01) |
| *B01D 47/06* | (2006.01) |
| *F23L 7/00* | (2006.01) |
| *F24H 1/00* | (2022.01) |
| *F27D 17/28* | (2025.01) |

(52) U.S. Cl.
CPC ................ *F23J 15/06* (2013.01); *A01G 7/02* (2013.01); *B01D 3/26* (2013.01); *B01D 3/32* (2013.01); *B01D 47/06* (2013.01); *F24H 1/0072* (2013.01); *F27D 17/28* (2025.01); *F23J 2219/80* (2013.01); *F23L 7/007* (2013.01)

(58) Field of Classification Search
CPC .......... F23J 15/06; F23J 2219/80; A01G 7/02; F24H 1/0072; F23L 7/007; F27D 17/28; B01D 3/26; B01D 3/32; B01D 47/06
See application file for complete search history.

(56) References Cited

U.S. PATENT DOCUMENTS

| | | | |
|---|---|---|---|
| 10,898,846 B1 * | 1/2021 | Kolodji | ................. B01D 53/84 |
| 2016/0244346 A1 * | 8/2016 | Bernar | ................... E21B 43/24 |

FOREIGN PATENT DOCUMENTS

| | | | | |
|---|---|---|---|---|
| CN | 208595737 U | * | 3/2019 | |
| CN | 112023636 A | * | 12/2020 | ......... B01D 53/1406 |

OTHER PUBLICATIONS

Doe_absorption_chillers_for_chp_systems_2017.pdf (Year: 2017).*
Science_Direct_journal_of_membrane_science_1986.pdf (Year: 1986).*
CN-112023636-A translation (Year: 2025).*
CN-208595737-U translation (Year: 2025).*

* cited by examiner

*Primary Examiner* — Michael G Hoang
*Assistant Examiner* — Kurt J Wolford
(74) *Attorney, Agent, or Firm* — James M. Duncan; Young Wooldridge, LLP

(57) ABSTRACT

A gas quench tower of a flue gas generator utilizes an incoming water stream at ambient temperature to cool the flue gas stream. Hot water discharged from the flue gas quench tower can be pumped to a variety of destinations, including the flue gas generator to be utilized as boiler feed water having an elevated temperature, thereby reducing the fuel demand for the boiler. Water may also be used to supply hot water demand to a building or may be utilized in an absorption chiller to provide chilled air. The oxygen content of the feed air delivered to the flue gas generator may be enriched by use of a membrane unit which provides a permeate stream having an enriched oxygen and carbon dioxide content to replace normal combustion air, reduce consumption of fuel gas, and further concentrate the $CO_2$ and water in the flue gas.

10 Claims, 6 Drawing Sheets

PROCESS AND SYSTEM FOR WASTE HEAT RECOVERY FROM A FLUE GAS GENERATOR

BACKGROUND OF THE INVENTION

This invention relates to recovering waste heat from a flue gas generator. This invention more specifically relates to recovering waste heat from power plants, internal combustion engines, steam generators or boilers including natural gas, bio-gas, and waste fired power plants or boilers. This invention may further provide, as a component of the waste heat recovery process and system, the enrichment of oxygen in air with membranes to reduce the fuel consumption of the fuel gas generator without lowering the duty or alternatively leaving the fuel consumption the same, and increasing the duty of the flue gas generator. This invention may further provide, as a component of the oxygen enrichment and waste heat recovery process and system, the capture and/or enrichment of carbon dioxide from the power plant emissions and distributing and/or sequestering the carbon dioxide or otherwise processing the carbon dioxide to minimize contribution to the atmospheric greenhouse gases ("GHG"). Embodiments of the present invention, utilizing an absorption refrigerator, are capable of providing a closed system which may provide hot water or cold water for use in building HVAC systems FIG. 1 depicts, as an example of one type of prior art flue gas generator, a power plant which vents hot flue gas to the atmosphere via a flue (i.e., a pipe or conduit) which conveys hot exhaust gases from the power plant. The stream of flue gas, which normally leaves the flue at a temperature of approximately 330 degrees Fahrenheit, contains elevated concentrations of carbon dioxide, e.g., approximately 5% or 50,000 parts-per-million. As another example of a flue generator, an internal combustion engine, whether fuel by gasoline, diesel or other fuels, vents exhaust gas at even higher temperatures with even higher concentrations of carbon dioxide—e.g., approximately 13% or 130,000 parts-per-million. These percentages are relative to only a few hundred parts-per-million carbon dioxide in the atmosphere, and therefore show that flue gas and exhaust gas (collectively referred to herein as "flue gas") provide a substantial contribution to the atmospheric GHG.

Flue gas is defined as the combustion products of a hydrocarbon fuel and air process. The hydrocarbon fuel can be natural gas, propane, gasoline, bio-gas, waste gas, and other fuels. Dry air is composed of approximately 79 percent nitrogen, approximately 21 percent oxygen, approximately 10 percent water (in humid air) and other trace components in the parts per million, including carbon dioxide at between 300 to 400 ppm. The direct combustion products resulting in flue gas contain elevated levels of carbon dioxide (approximately 5 to 13percent) and water (usually under 30 percent). Also contained in the gas is a relatively inert nitrogen component which passes through the flue along with any excess un-combusted oxygen. These combustion products are produced at an elevated temperature usually in a firing chamber at hundreds of degrees Fahrenheit, and at relatively low pressures, usually near atmospheric.

Air with nitrogen removed, and with higher (i.e., enriched) concentrations of reactant oxygen (greater than 21%) entering a reaction chamber with a reactant fuel (such as natural gas, or other fuels identified above) requires a lower reactant fuel rate to achieve the same duty with respect to a combustion reaction occurring than with normal air at 21% oxygen where more fuel gas is required due to the heat wasted in heating the higher concentration of inert nitrogen. When enriched levels of oxygen are used in the reaction chamber, a correspondingly higher firing temperature provides higher heat value that offsets the lower flow rate of flue gas produced. In embodiments of the present invention, are having an enriched oxygen component produced via enrichment membranes may be used to replace a conventional process air supply, say for combustion air in a boiler, power plant furnace, internal combustion engine or the other flue gas generators described above.

Flue gas emissions generated either with either atmospheric air or air with an enriched oxygen component have high temperatures, low pressures, and a relatively high carbon dioxide concentration with respect to the normal concentration in air. The high temperature of the flue gas provides an opportunity for waste heat recovery which may be used to reduce the fuel consumption of the boiler or power plant and to provide, as disclosed herein, a source of hot water which may be utilized in a closed system having absorption refrigeration components to provide heat and cooling for building structures.

For purposes of the present invention, waste heat is captured via a gas-gas exchanger and/or a quench tower into which the flue gas is directed. Hot air produced by the gas-gas exchanger may be used for building space heating or other applications requiring heat. Hot water produced by the quench tower may thereafter be used as boiler feed water, building hot water supply, or other applications utilizing hot water, thereby reducing the fuel requirements for the boiler. In addition, the hot water may be directed to absorption refrigeration components, such as a lithium-bromide system, to provide, with a closed system, a source of heat or cooling for a building structure. The quench tower also cools the flue gas emissions for beneficial use of the carbon dioxide by applying it to crops for carbon enhancement of the crops and to biosquester the carbon dioxide.

Because the sources of flue gas are ubiquitous, capturing even a modest portion of the carbon dioxide from flue gas yields meaningful results in decreasing carbon dioxide releases to the atmosphere. There are commercial uses for carbon dioxide, including various manufacturing processes and enhanced oil recovery in oil production which artificially sequester the carbon dioxide, at least for a period of time. There also natural sequestration systems, which include the oceans, soils, forests, plants and micro-organisms. The biomass (roots, leaves, branches, etc.) of trees and plants are estimated by the US DOE in 2008 to currently hold approximately 550 gigatons CO2 worldwide, with photosynthesis in such biomass removing approximately 60 gigatons carbon dioxide per year, as follows: (1) forests removing approximately 10 gigatons; (2) permanent crops (orchards, vineyards) 3 gigatons; (3) annual (row) crops removing 11 gigatons; and (4) pasture land removing 36 gigatons.

In view of these natural sequestration systems, the processing of the flue gas through the quench tower may provide, in addition to those suggested above, yet another solution to the GHG impact of the carbon dioxide. The molecular weight of the cooled and dewatered flue gas increases to a molecular weight of over 30, causing the gas to "slump" and not be buoyant with respect to the lighter ambient air. Thus, the cooled and dewatered flue gas will tend to hug the ground. When the cooled and dewatered flue gas is safely dispersed at grade to a concentration under 4000 ppm, it will ultimately encounter and enrich the biomass and be biologically sequestered thereby.

For purposes of this invention, the term "carbon dioxide control mechanism" is defined herein as any of a variety of mechanisms or processes which sequester or immobilize the carbon dioxide thereby preventing or inhibiting the immediate release back into the atmosphere. The term may include systems which utilize bio-sequestration, such as orchards, crops, forests, and other photosynthetic organisms which convert carbon dioxide utilizing photosynthesis or store the carbon dioxide in the organism. The carbon dioxide control mechanism may also include a system which injects carbon dioxide into petroleum reserves for purposes of enhanced oil recovery such as miscible flooding. A carbon dioxide control mechanism, as defined herein, may also refer to processes which utilize carbon dioxide, such as a refrigerant. Finally, as discussed above, the term carbon dioxide control mechanism as defined herein, also includes the cooling and dewatering of flue gas and dispersing it at approximate ground level for ultimate biosequestration by the biomass.

A system which minimizes fuel gas consumption in boilers, power plants, and internal combustion engines while recovering waste heat and capturing/immobilizing carbon dioxide is desirable.

SUMMARY OF THE INVENTION

The present invention redirects emissions from a flue gas generator continuously or on demand, to a flue gas quench column or other heat exchanger which utilize water for cooling. The cooling water is heated in the flue gas quench column or other heat exchanger and thereafter pumped by a hot water pump for delivery to a power plant boiler, a heat exchanger for an internal combustion engine, and/or to a hot water supply system for use for a building or other use.

In another embodiment of the invention, hot water from the flue gas quench column or other heat exchanger may be directed to one or more absorption refrigeration units, such as a lithium bromide refrigeration unit, which may be utilized to provide heat or cooling to a building structure In an embodiment of the invention, the absorption refrigeration units may be closed systems, with the same water utilized as cooling water and for conducting heat.

In an embodiment of the invention, a gas-gas heat exchanger may be utilized to heat outside air with flue gas on demand for distribution into an existing or new building HVAC system.

After being cooled in the quench tower or gas-gas heat exchanger, the cooled flue gas may, if desired, be cooled further, diluted, dewatered, and/or concentrated and then distributed to a variety of carbon dioxide control mechanisms, which may include a biosequestration facility for carbon enrichment of crops utilizing a gas distribution system which may comprise ducting or other inexpensive and low pressure conduits. Because of the low anticipated pressures, the gas distribution network may be configured from thin-walled materials.

Alternatively, carbon dioxide enriched gas may be injected underground.

Alternatively, carbon dioxide enriched gas may be utilized for a variety of industrial purposes.

Alternatively, cooled and dewatered flue gas may be dispersed at grade for ultimate biosequestration by the biomass.

In another embodiment of the invention, a membrane system may be utilized to feed enriched oxygen to the flue gas generator. The use of a membrane system enriches the oxygen and carbon dioxide concentrations of a gas stream processed through the membrane system. Oxygen and carbon dioxide pass (i.e. permeate) more rapidly through the membrane relative to nitrogen, thereby forming a permeate stream which is more concentrated or enriched in oxygen and carbon dioxide than the "feed" stream. The use of an oxygen-enriched feed gas to the flue gas generator reduces fuel gas consumption, reduces the total volume of flue gas, and saves in capital and operating costs of equipment.

The membranes utilized for oxygen enrichment may be of the spiral wound, hollow fiber, or flat sheet type. Alternatively, a leaf membrane structure or a hollow tube membrane configuration may be utilized as respectively described in the Applicant's presently pending U.S. Pat. No. 11,247,176 ("Apparatus and Method for Direct Air Capture of Carbon Dioxide from the Atmosphere") and U.S. patent application Ser. No. 17/121,560 ("Apparatus and Method for Oxygen and Carbon Dioxide Enrichment of Atmospheric Air") which patent and application are incorporated herein in their entireties by this reference. Both of these membrane systems utilize relatively low vacuum and require little energy to operate.

BRIEF DESCRIPTION OF THE DRAWINGS

FIG. 5 also shows an optional steam chiller which receives steam from the boiler and thereby provides cooled water.

FIG. 6 also shows an optional steam chiller which receives steam from the boiler and thereby provides cooled water.

DETAILED DESCRIPTION OF THE EMBODIMENTS

Figure 1:
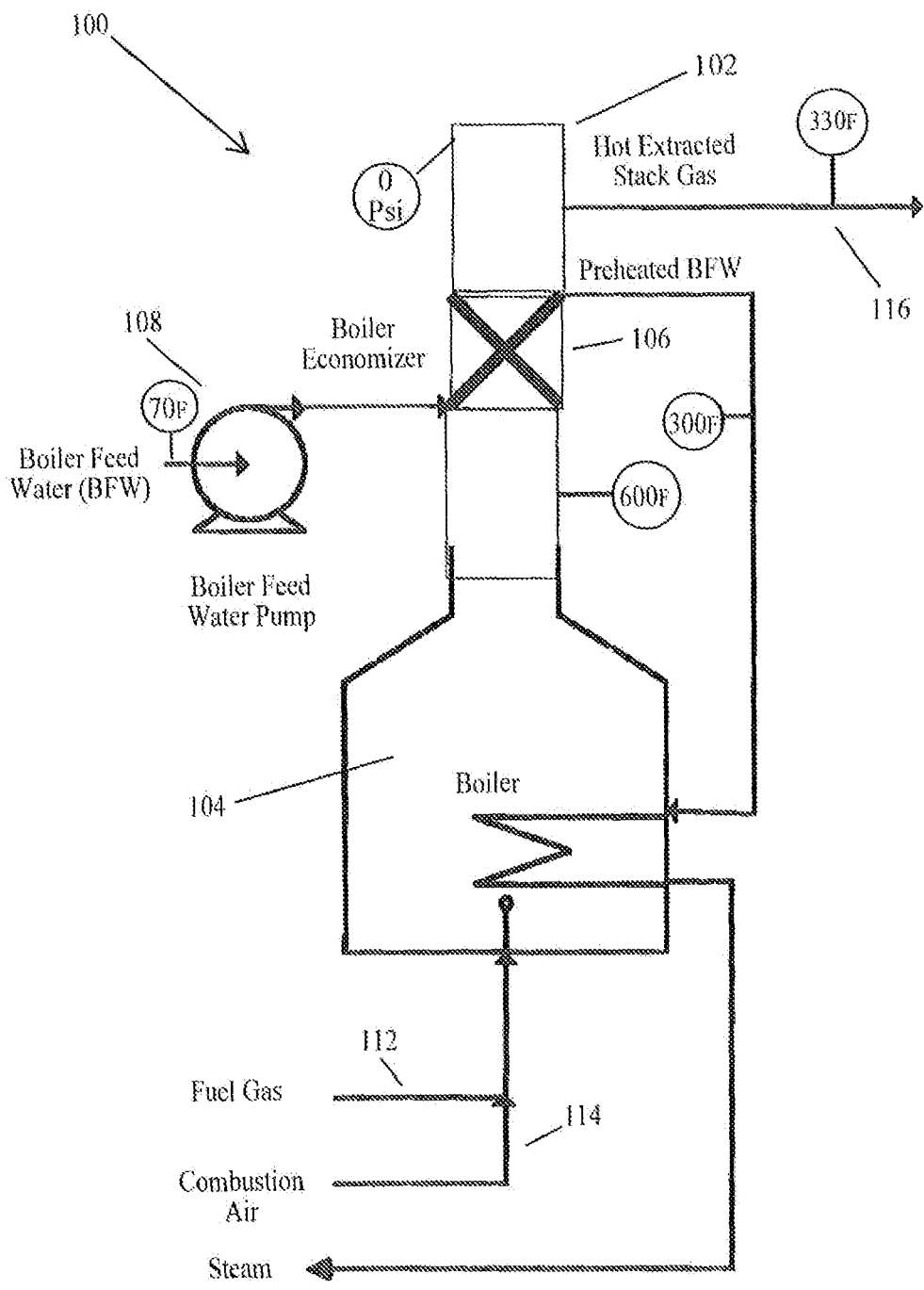
FIG. 1 schematically depicts an embodiment of a prior art power flue gas generator with an economizer. The temperatures and pressures indicated on FIG. 1 are approximations which are provided to show the relative differences in the prior art systems and the presently disclosed systems. It is noted that the flue gas generator shown in FIG. 1 depicts an embodiment of the invention utilizing a boiler and an economizer. However, other embodiments of flue gas generator may be utilized in embodiments of the invention which do not require either a boiler or economizer.

FIG. 1 depicts a prior art flue gas source 100. For this particular embodiment of a flue gas source 100, it has a stack or flue 102, a boiler 104, and an economizer 106 which is a heat exchanger which saves on fuel gas by preheating boiler water feed water from ambient temperature on the tube side to approximately 200 to 300 degrees Fahrenheit, utilizing hot stack gas on the shell side. Boiler feed water is provided to the economizer by boiler feed water pump 108. Fuel for the boiler 104 is delivered through fuel inlet 112. Combustion air for the flue gas source is delivered through air inlet 114. Vented flue gas flows out through vent 116 at a temperature of approximately 330 degrees Fahrenheit.

Figure 2:
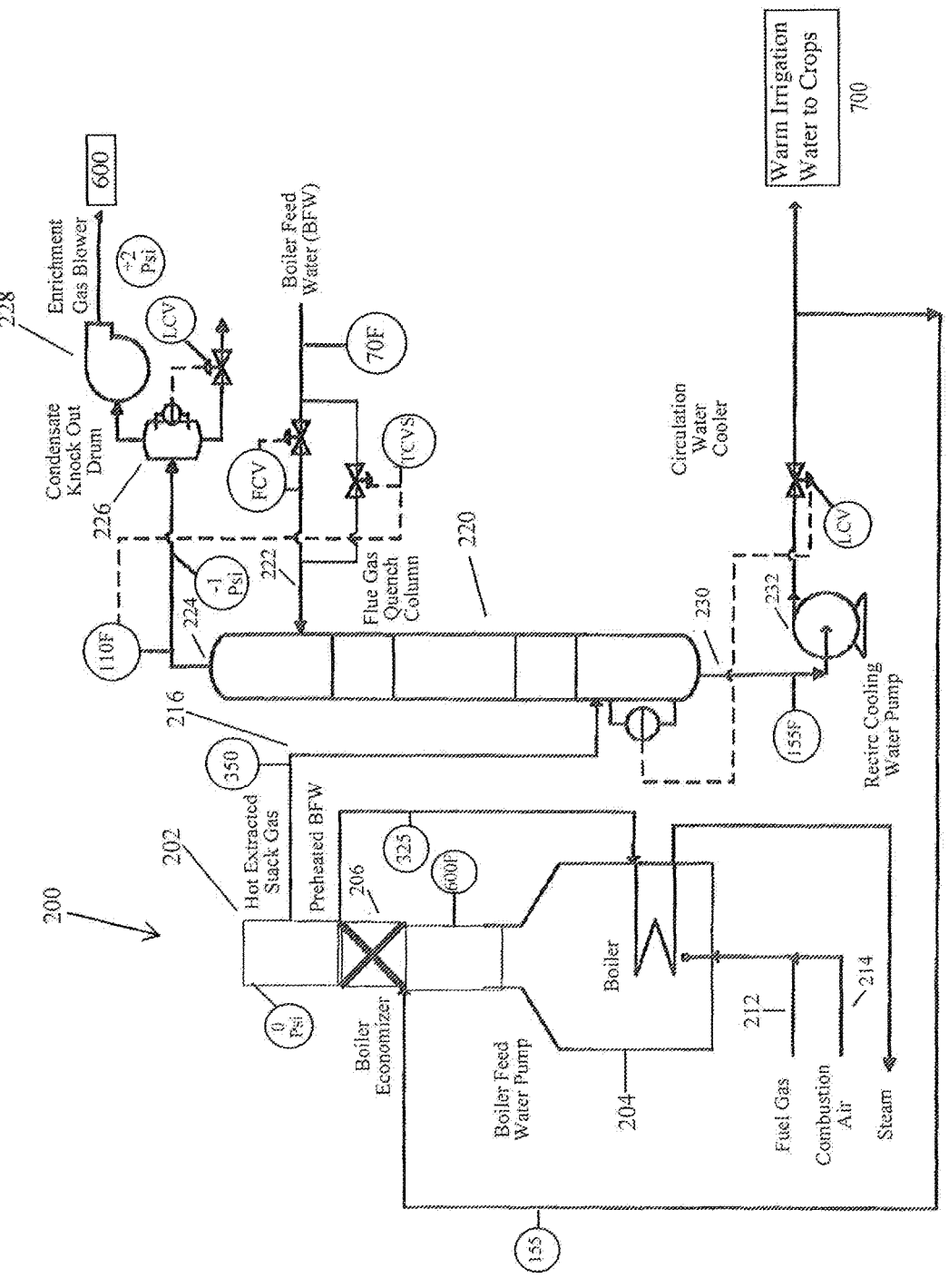
FIG. 2 is a process flow diagram for an embodiment of a flue gas generator which includes an embodiment of the presently disclosed system for hot water supply. The temperatures and pressures indicated on FIG. 2 are approximations which are provided to show the relative differences between this embodiment of the present invention and the prior art systems.

FIG. 2 depicts an embodiment of a flue gas source 200 which includes an embodiment of the presently disclosed system for hot water supply. The temperatures and pressures indicated on FIG. 2 are approximations which are provided to show the relative differences between this embodiment of the present invention and the prior art systems. Flue gas source 200 has a flue 202 and may have, for this application, a boiler 204 and an economizer 206. Fuel for the boiler 204 is delivered through fuel inlet 212. Combustion air for the flue gas source is delivered through air inlet 214. However, for the reasons provided below, the vented flue gas flows out through vent 216 at a higher temperature relative to the temperature of the vented flue gas from the prior art flue gas source 100. In the embodiment of the invention depicted in FIG. 2, the vented flue gas is directed into a flue gas quench column 220. The flue gas quench column 220 has a cooling water inlet 222 through which water is delivered to the column at ambient temperature (below 100 F). As hot gas flows through the flue gas quench column 220 there is heat transfer from the vented flue gas to the cooling water such that the gas is cooled to approximately 110 degrees Fahrenheit at the flue gas quench column gas outlet 224. The cooled gas—with a high concentration of carbon dioxide—flows to a condensate knock out drum 226 and then pressurized by blower 228 for delivery to a carbon dioxide control mechanism 600, which may include a biosequestration facility, an underground injection system, or other mechanisms which render the carbon dioxide immobile. It is to be appreciated that the gas may be further enriched by enrichment membranes (as described in the Applicant's previous patent and application referenced above) prior to delivery to the sequestration facility 600. As an alternative, cooled and dewatered flue gas may directed from flue gas quench column outlet 224 and disbursed at grade for biosequestration by biomass.

Flue gas quench column 220 has a heated water outlet 230 through which heated water is discharged from the column to a hot water destination, which may include the boiler 204. The heated water can be pumped by recirculating pump 232 and delivered as boiler feed water to the economizer 206 at an elevated temperature significantly higher than the boiler feed water of the prior art flue gas sources. As a result, feed water delivered to boiler 204 is at a higher temperature than the boiler feed water of the prior art. Alternatively, the water may be pumped to an irrigation water system 700. Alternatively, the water may be pumped to assorted other hot water destinations, either singularly or collectively. These hot water destinations may include a hot water supply to a building structure and/or to be utilized to provide heat or cooling as discussed in greater detail below. The advantage in all cases is reduced power consumption. In the case systems requiring water pumping such as the boiler feed water pumping system or for the irrigation water pumping system, reduced power consumption is realized due to the hotter water having substantially lower viscosity. The other utilizations reduce power otherwise consumed through heating, cooling and ventilation systems.

Figure 3:
FIG. 3 is a process flow diagram for an embodiment of a flue gas generator which includes an embodiment of the presently disclosed system which utilizes an oxygen enrichment membrane of the air gas stream utilized with the flue gas generator.

FIG. 3 depicts an embodiment of a flue gas generator 300 similar to that depicted in FIG. 2, except that air provided to boiler 304 first passes through membrane unit 350. Membrane unit 350 utilizes a vacuum generation device 352 to draw ambient air or atmospheric air into contact with the individual membrane units and to pull the permeate through each membrane. The vacuum generating device 352 may be a blower or liquid ring compressor, although both types of devices require liquid separation. Alternatively, a bellows-type vacuum device (as described in the Applicant's Patent and Patent Application referenced above) may be utilized. Vacuum generation device 352 discharges a permeate stream which, after being dehydrated as necessary by separator 354, is delivered to air inlet 314.

The oxygen enrichment provided by membrane unit 350 provides a hotter flue gas and the gas flowing through vent 316 is delivered to flue gas quench column 320 at a higher temperature. The components of flue gas quench column 320 are the same as for gas quench column 220, but the heated water pumped by recirculating ump 332 is delivered at a higher temperature to the economizer 306 or directed to an irrigation system 700 or may be pumped to a building structure (not shown). The cooled gas—with a high concentration of carbon dioxide—flows to a condensate knock out drum 326 and then pressurized by blower 328 for delivery to a sequestration facility 600. Cooled and dewatered carbon dioxide gas may be provided for delivery to the sequestration facility 600 or otherwise directed to grade as described above.

Figure 4:
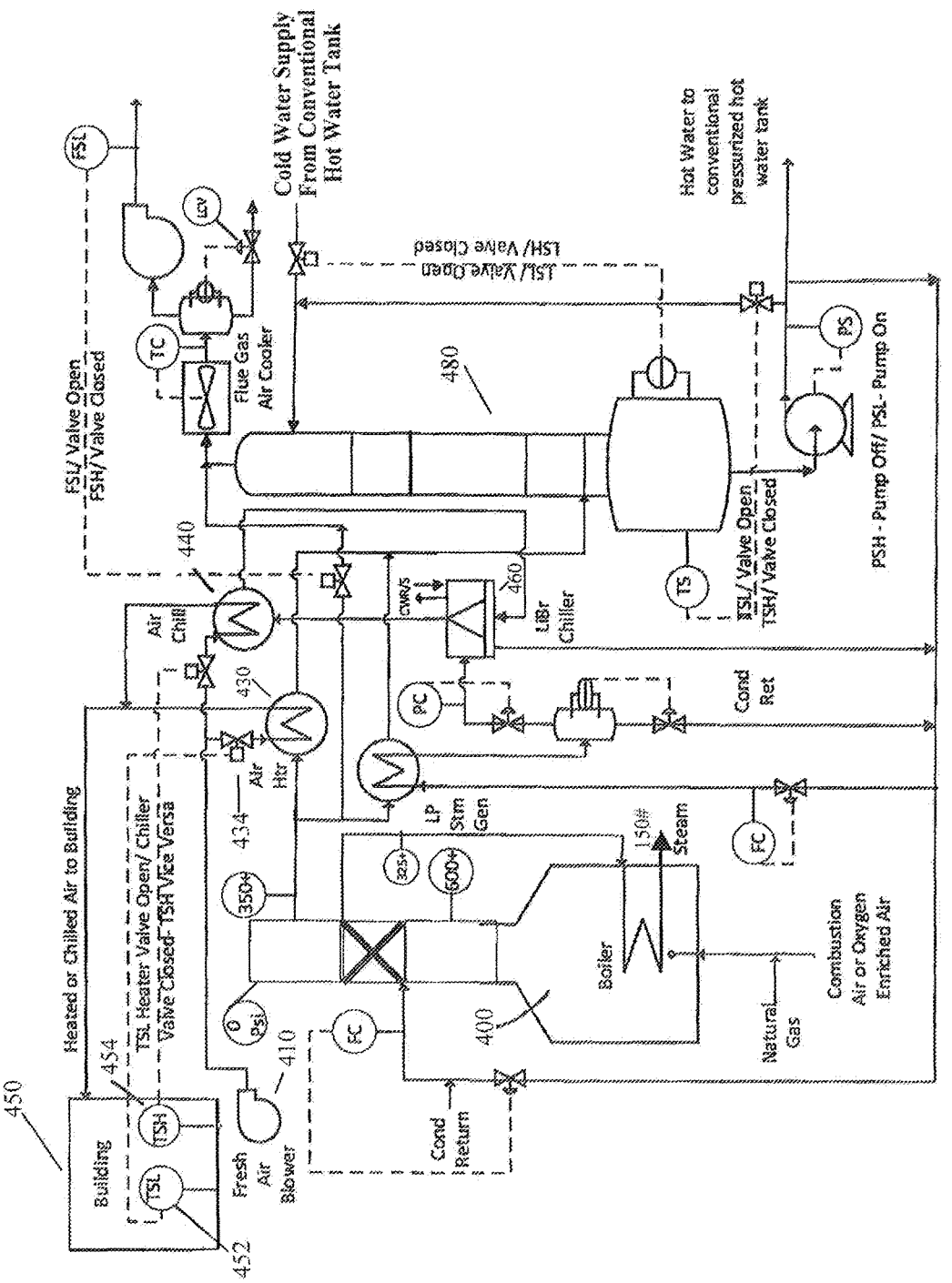
FIG. 4 is a process and flow diagram for an embodiment of a flue gas generator which utilizes a quench column and an absorption refrigeration unit to provide heat or cooling to a building structure and/or hot water for other uses.

FIG. 4 depicts an embodiment of a flue gas generator 400 similar to that depicted in FIGS. 1-3, except that an existing or new outside air blower 410 for a building 450 may be activated on demand for heating or cooling with temperature switch low 452 and temperature switch high 454. Outside air blower 410 sends a portion of an air stream through gas-gas exchanger 430 to provide heat to building 450. A flue gas blower may be started after the outside air blower, drawing in the cooler (about 100 F) flue gas and/or air mixture downstream of the other side of the gas-gas heat exchanger 430. Hot water from quench column 480 may be routed to absorption chiller unit 460, which chills the water and may direct it to heat exchanger 440 for providing chilled air to either building 450 or further cooling of the flue gas.

Figure 5:
FIG. 5 is a process and flow diagram for another embodiment of a flue gas generator which utilizes a quench column and an absorption refrigeration unit which receives hot water from the quench column and thereby provides cooling to a building structure.

FIG. 5 depicts an embodiment of a flue gas generator 500 in which water is provided to boiler 504 and quench column 520 in an as-demanded fashion. Further the quench column 520 with the enrichment gas blower makes hot water only as demanded (in a semi-continuous fashion.) The hot water pump 530 delivers the building's hot water needs as demanded. Controls 548 for making the hot water include a level switch low 548 which first opens the quench column water supply valve, and then next starts enrichment gas blower 528. When the level in the quench column well 544 reaches a high level, a level switch high (LSH) turns the enriched gas blower 528 off, and then next closes the supply water valve. A larger insulated quench column well 546 for hot water storage is provided at the bottom of the quench column 520. If the water temperature drops within the quench column drops below a minimum temperature, say 130 F, the Temperature Switch Low opens a recirculation valve and starts enrichment gas blower 528, in that order. Once the temperature of the water within the quench column well reaches a high temperature set point, say 150 F, the temperature switch high shuts the blower 528 and closes the valve in that order. The water pump 530 continuously operates providing water on demand. When demand is reduced, a minimum flow bypass pressure control system keeps the pump running and the hot water pressurized to provide continuous on demand supply of hot water by recirculating water at the pump's rated minimum flow rate through a small cooler keeping the flow bypass under temperature control before returning back to the quench column well. Warm (not hot) water returns to the top of the quench column. Multiple temperature waters can be available from this system. For cooler/tempered hot water for potable hot water purposes, a water tempering system keeping the hot water at a lower set temperature, say 120 F, by direct cooling with fresh cold water providing temperature control for the hot water supply. A safeguard for the blower is provided with a temperature switch high and shutdown should the blower suction temperature be higher than 110 F.

Figure 6:
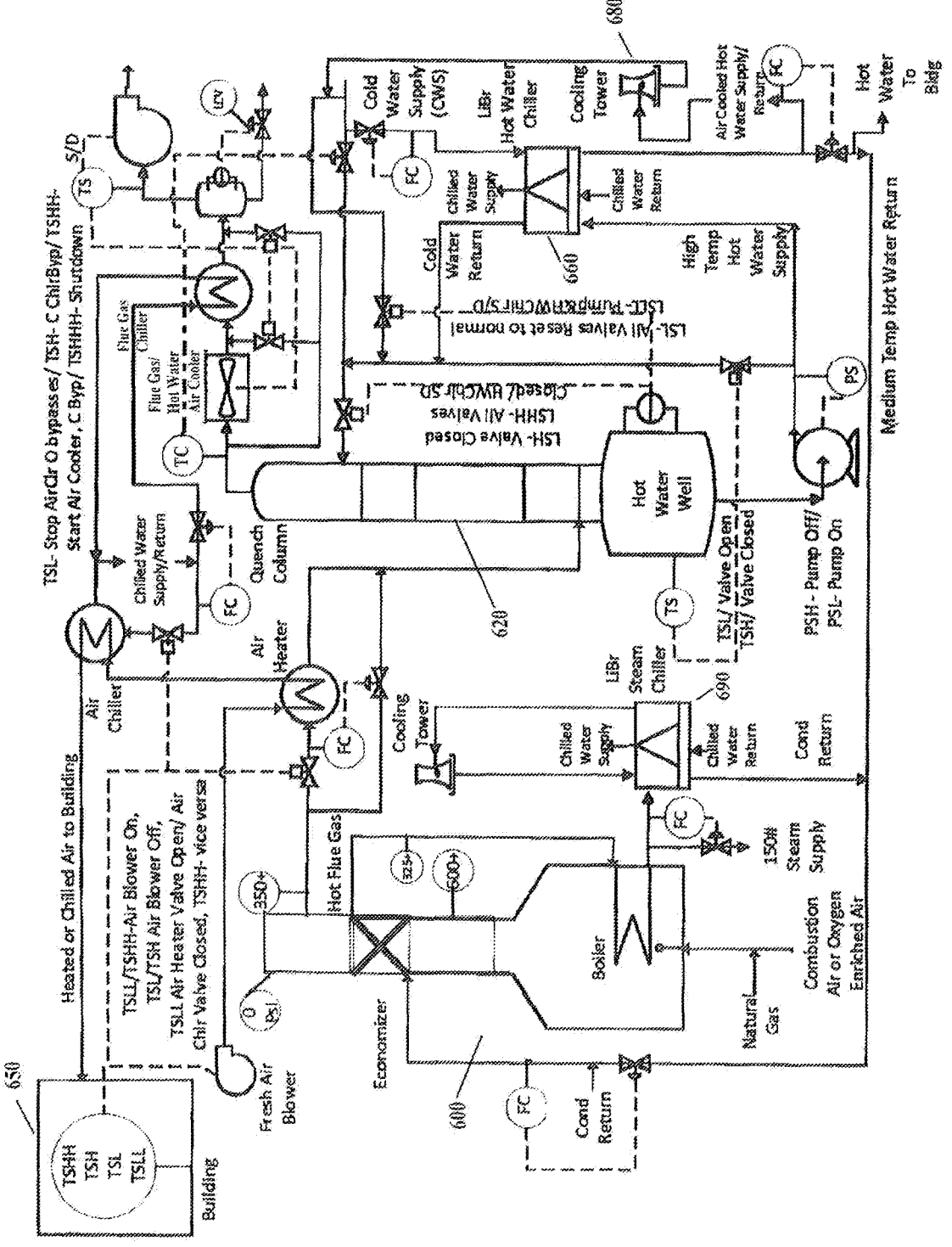
FIG. 6 is a process and flow diagram for another embodiment of a flue gas generator which utilizes a quench column and an absorption refrigeration unit which receives hot water from the quench column and thereby provides cooling to a building structure. Utilizing valving and cooling towers, the embodiment of the invention depicted in FIG. 6 is a closed systems in which the same water utilized as cooling water in the quench tower is provided as hot water to the absorption cooler and discharged as cold water. It is to be appreciated that the absorption cooler does not require compression of the refrigerant as necessary with other refrigerated chillers.

FIG. 6 is a process and flow diagram for another embodiment of a flue gas generator 600 which utilizes a quench column 620 and an absorption cooling unit 660 which receives hot water from the quench column and thereby provides cooling to a building structure 650. Utilizing valving and cooling tower 680 the embodiment of the invention depicted in FIG. 6 is a closed system in which the same water utilized as cooling water in the quench tower 620 is provided as hot water to the absorption cooler 660 and discharged as cold water. It is to be appreciated that the absorption cooler 660 does not require compression of the refrigerant as necessary with other refrigerated chillers. FIG. 6 also shows an optional steam chiller 690 which receives steam from the boiler and thereby provides cooled water.

While the above is a description of various embodiments of the present invention, further modifications may be employed without departing from the spirit and scope of the present invention. Thus the scope of the invention should not be limited according to these factors, but according to the following appended claims.

What is claimed is:

1. A system for waste heat recovery from a flue gas generator comprising:

a flue gas quench column configured to receive at least a portion of a hot gas stream from the flue gas generator, wherein the flue gas quench column further comprises a cool water inlet, a hot water discharge, a cooled gas outlet for discharge of a cooled gas stream, and a hot water well comprising a low level switch, a high level switch and a temperature shutdown switch, wherein the temperature shutdown switch, high level switch and low level switch are configured to stop the cooled gas blower and open and close a water supply valve;

a hot water supply pump connected to the hot water discharge, wherein the hot water supply pump delivers hot water from the flue gasquench column to a hot water supply destination;

a liquid knockout device connected to the cooled gas outlet wherein the cooled gas stream is dehydrated resulting in a cooled and dehydrated gas stream; and a cooled gas blower connected to the cooled gas outlet, the cooled gas blower pressurizing the cooled and dehydrated gas stream for delivery to a carbon dioxide control mechanism.

2. The system of claim 1 wherein the hot water supply destination comprises a boiler for the flue gas generator.

3. The system of claim 1 wherein the hot water supply destination comprises an irrigation water system.

4. The system of claim 1 wherein the hot water supply destination comprises a hot water source for a building.

5. The system of claim 1 wherein the hot water supply destination comprises a heat exchanger.

6. The system of claim 1 wherein the hot water supply destination comprises a lithium-bromide absorption chiller.

7. The system of claim 6 wherein the lithium-bromide absorption chiller provides chilled air to a building and/or chilled air to a heat exchanger for cooling of the hot gas stream.

8. The system of claim 7 wherein the lithium-bromide absorption chiller is a closed system.

9. The system of claim 1 further comprising a membrane unit which enriches the oxygen content of a combustion air stream delivered to the flue gas generator.

10. The system of claim 1 wherein the carbon dioxide control mechanism comprises a conduit from the cooled gas outlet wherein the conduit delivers and discharges a cooled and dewatered gas stream at grade.

* * * * *